(12) United States Patent
Huebner

(10) Patent No.: US 6,549,726 B2
(45) Date of Patent: Apr. 15, 2003

(54) CONTROLLED ENVIRONMENT PHOTO STUDIO

(76) Inventor: Roger F. Huebner, 202 University Dr., Arlington, TX (US) 76013

( * ) Notice: Subject to any disclaimer, the term of this patent is extended or adjusted under 35 U.S.C. 154(b) by 30 days.

(21) Appl. No.: 09/908,120

(22) Filed: Jul. 17, 2001

(65) Prior Publication Data

US 2001/0041064 A1 Nov. 15, 2001

Related U.S. Application Data

(62) Division of application No. 09/522,459, filed on Mar. 9, 2000, now Pat. No. 6,343,184.

(51) Int. Cl.[7] .............................................. G03B 15/00
(52) U.S. Cl. ........................... 396/5; 396/428; 348/373; 348/552
(58) Field of Search .......................... 396/3, 4, 5, 428; 396/322; 348/135, 373, 552

(56) References Cited

U.S. PATENT DOCUMENTS

| | | | | |
|---|---|---|---|---|
| 501,340 A | * | 7/1893 | Hackh | 396/1 |
| 675,417 A | | 6/1901 | Selke | |
| 2,077,809 A | | 4/1937 | Ripert | 88/24 |
| 2,140,602 A | * | 12/1938 | Simjian | 33/17 R |
| 2,599,269 A | | 6/1952 | Markle | 95/86 |
| 3,437,022 A | * | 4/1969 | Hamonds, Jr. | 356/389 |
| 3,690,242 A | * | 9/1972 | Cruickshank | 355/48 |
| 3,967,301 A | | 6/1976 | Corning | 354/292 |
| 4,236,795 A | * | 12/1980 | Kephart | 396/3 |
| 4,264,168 A | | 4/1981 | Baliozian | 354/77 |
| 4,372,659 A | * | 2/1983 | Ogawa | 396/24 |
| 5,857,119 A | | 1/1999 | Borden | 396/5 |
| 5,864,640 A | * | 1/1999 | Miramonti et al. | 345/419 |
| 6,343,184 B1 | * | 1/2002 | Heubner | 396/3 |

* cited by examiner

Primary Examiner—David M. Gray
(74) Attorney, Agent, or Firm—Rudolf O. Siegesmund

(57) ABSTRACT

An apparatus comprising a support element, a frame or enclosure rotatably attached to the support element and a camera rotatably attached to the frame or enclosure. The frame or enclosure can rotate about a subject placed on the support element in the horizontal and in the vertical. A camera mounted on the frame or enclosure rotates about the subject with the frame or enclosure and can also move toward or away from the subject. The frame can be covered with translucent material to create an enclosure around the subject and lighting may be applied either from outside the enclosure or inside the enclosure by placing lights affixed to the external frame through the material. In one embodiment, solid translucent material such as plexiglass can be both the frame and the enclosure. The support element includes at least one arm connected to a stage support which mounts a rotatable stage upon which the subject to be photographed is placed. The frame can support materials to create enclosures that are spherical in shape, conical, hemispherical and combinations of spheres, cones and hemispheres. The frame rotates about the support so that the subject stays stationary on the stage and the background of the subject always stays the same as the frame and camera rotate.

12 Claims, 11 Drawing Sheets

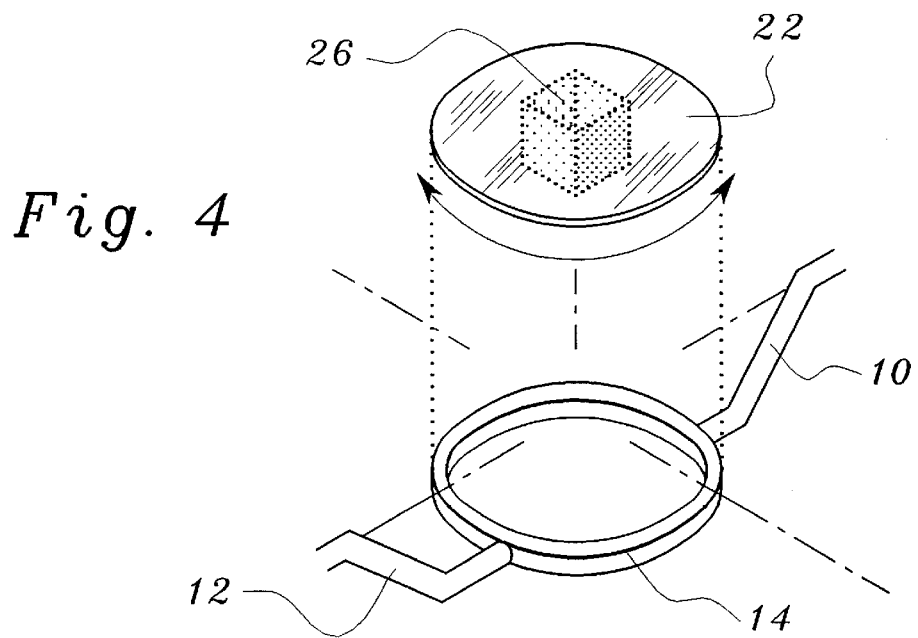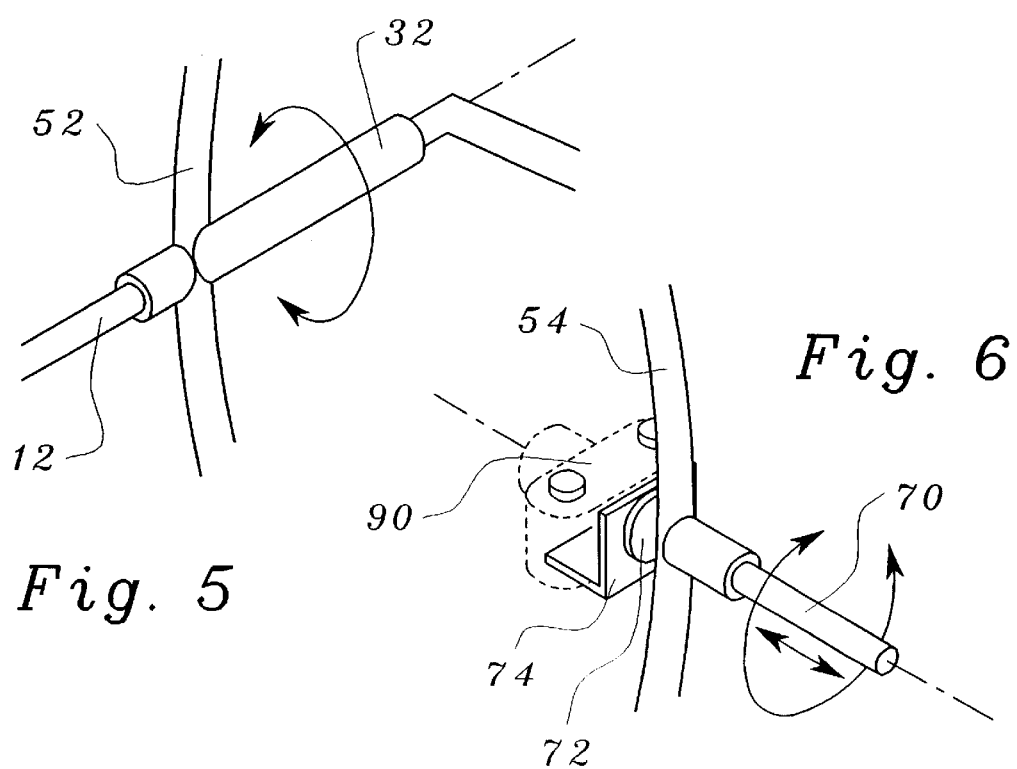

CONTROLLED ENVIRONMENT PHOTO STUDIO

This application is a division of application Ser. No. 09/522,459, filed on Mar. 09, 2000, now U.S. Pat. No. 6,343,184.

FIELD OF THE INVENTION

The present invention relates to devices for controlling the lighting environment of a subject in relation to a background to be photographed and in particular to a device for controlling the lighting while rotating the camera about the subject in the horizontal and vertical axis.

BACKGROUND OF THE INVENTION

Photographic studios use a variety of lighting instruments, light reflectors, light blockers (flags, fingers, dots), light intensity reducers (scrims), light pattern modifiers (go—betweens or "gobos") and diffusers to control the lighting effects on a stationary subject to be photographed. Such photography can be for a live subject or an inanimate subject. The camera captures an image of the subject and typically a field behind the subject known as the background. The background is seen in the camera's frame (active field of view) when there is a absence of subject (or target). Light may be reflected from the subject, the background or both the subject and the background affecting the quality of the subject image.

For professional photographs the physical environment around the subject to be photographed creates the presentation of the subject. Therefore controlling the environment is an essential part of producing a quality photographic image.

Photographers use a technique known as feathering which employs curved surfaces to reduce sharp edged or abrupt differences between highlights and shadow thus establishing steps or gradients of shadow depth, tone, and value. One method of controlling the lighting to effect feathering of light and shadow on a subject and the surface on which the subject rests is the use of a "jeweler's cone." A cone, shaped like a megaphone, having a truncated end with a small circular aperture at a first end and a large circular aperture at a second end is positioned over a subject and background to be photographed. The camera is positioned in the small circular aperture. The cone is made of translucent material and lighting is applied from angles selected by the photographer. Once positioned, the lights shine through the translucent material and the subject is photographed. Another method of employing a jeweler's cone is to hang a translucent drape above the subject where the bottom of the drape is a rigid ring to create a cone of material where slits or openings can be cut to insert the camera lens through the translucent material.

Another technique used by photographers is to place a translucent plexiglass dome over the subject to be photographed and to position lights outside and around the dome. A hole is cut in the dome to insert the camera lens. A further method is to place a subject on a table made of curving translucent material so that the subject rests on a curved surface and no sharp angles are present. Illumination from a lighting device on a boom above or below the curved surface made of diffuse plexiglass creates a graduated tone.

U.S. Pat. No. 5,857,119 discloses a motorized rotatable subject stand and a camera frame that is capable of swinging in an arc around the subject. U.S. Pat. 3,967,301 discloses a stand with a pedestal for the subject to be photographed, a hanger to hold a sheet of translucent material, and a lamp mounted on a base to illuminate the back of the sheet beyond which the subject is positioned. U.S. Pat. 3,690,242 discloses a studio in which the subject (which can be a person seated in a chair) is positioned on an inner portion and a camera and light stand are positioned on an outer portion and the inner portion and the outer portion are rotatable relative to each other.

The reason for all of these devices is to control the effect of light on the subject and to minimize the effect of darkness at the point where the lens is positioned. Most reflective surfaces create distorted images. Therefore, the environment of the subject to be photographed is a major concern in achieving a fine photographic effect. Additionally, due to the use of electronic catalogs on the Internet the need for high quality photographs of subjects is in increasing demand. Moreover, a studio in which lighting can be replicated with precision would allow programmed capturing of expert photographic techniques to be duplicated by amateurs following a computerized duplication of a professional or master's choice of lighting. Such a studio is both an artistic tool and a productivity tool. A further need is for a studio that can be operated by remote control and linked to a computer.

Therefore, what is needed beyond the prior art is a studio where the camera can rotate about the subject while the background stays fixed, zoom in on the subject and also photograph the subject from selected angles. What is further needed beyond the prior art is a studio which can transmit light from outside the studio, inside the studio or reflect off of the surface of the studio. What is further needed is a rotatable studio in which the background is always fixed in relation to the subject. Finally, what is needed beyond the prior art is a studio that can meet the needs identified above and that can also be adapted to a drive system and linked to a computer for computer control.

SUMMARY OF THEE INVENTION

The present invention which meets the needs identified above is an apparatus comprising a support element, a frame or enclosure rotatably attached to the support element and a camera rotatably attached to the frame or enclosure. The frame or enclosure can rotate about a subject placed on the support element in the horizontal and in the vertical. A camera mounted on the frame or enclosure rotates about the subject with the frame or enclosure and can also move toward or away from the subject. The frame can be covered with translucent material to create an enclosure around the subject and lighting may be applied either from outside the enclosure or inside the enclosure by placing lights affixed to the external frame through the material. In one embodiment, solid translucent material such as plexiglass can be both the frame and the enclosure. The support element includes at least one arm connected to a stage support which mounts a rotatable stage upon which the subject to be photographed is placed. The frame can support materials to create enclosures that are spherical, cylindrical, conical, hemispherical and combinations of spheres, cylinders, cones and hemispheres. While the aforementioned shapes are most desirable because of the absence of sharp angles, any shape can function and so the enclosures should not be limited to those enumerated above. The frame rotates about the support so that the subject stays stationary on the stage and the background of the subject always stays the same as the frame and camera rotate.

The foregoing and other features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 4 depicts a detailed view of the stage support and stage.

FIG. 5 depicts a detailed view of the first sleeve.

FIG. 6 depicts a detailed view of the camera mount.

DETAILED DESCRIPTION OF THE PREFERRED EMBODIMENT

Figure 1:
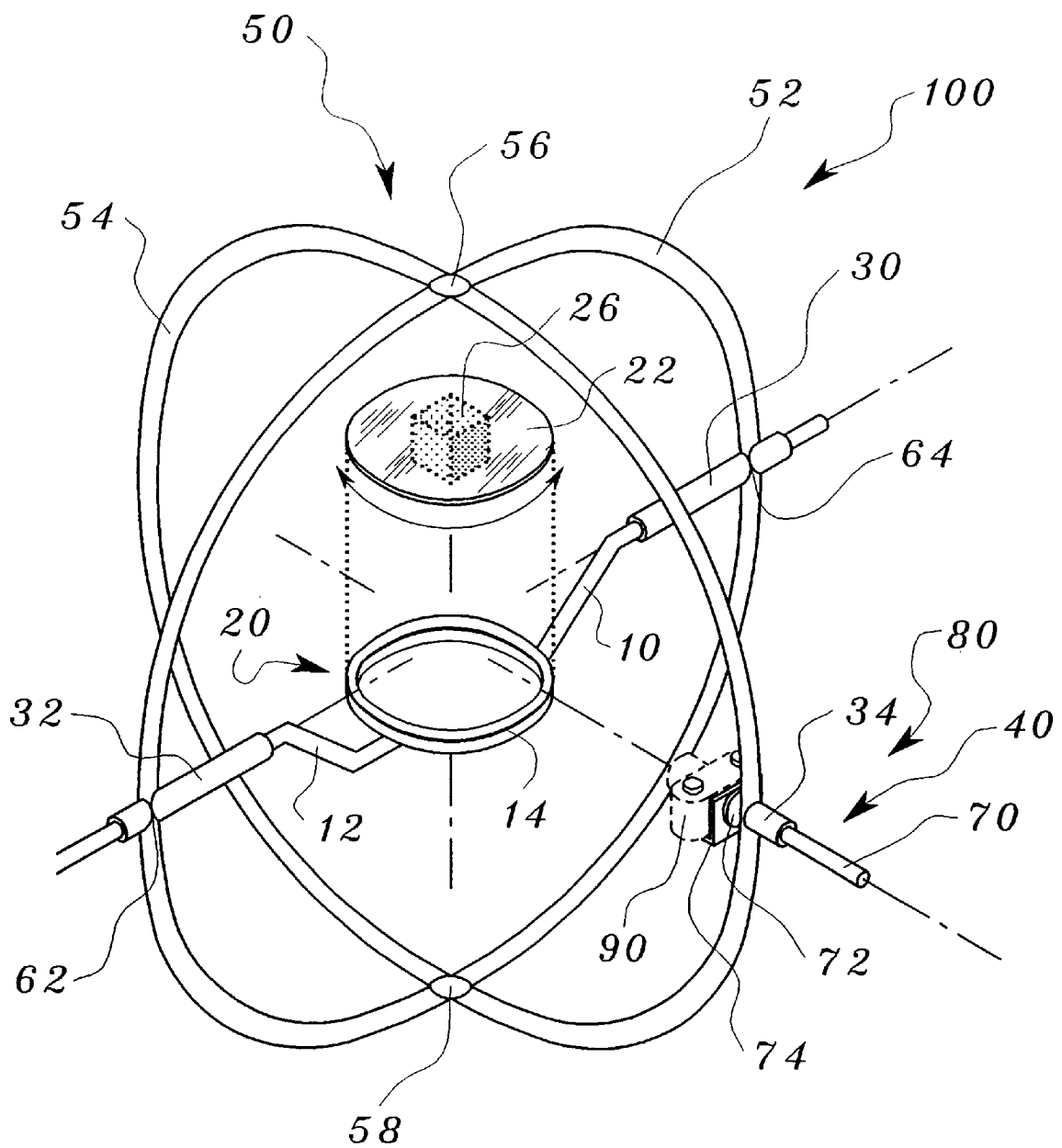
FIG. 1 depicts a left perspective view of the frame, stage and camera mount.

FIG. 1 depicts studio 100 with support element 20, frame element 50 and camera element 80. Support element 20 has first arm 10 fixedly connected to stage support 14 and second arm 12 fixedly connected to stage support 14. Stage 22 is rotatably connected to stage support 14. First arm 12 and second arm 14 may extend to a floor, a wall or a ceiling.

Frame element 50 has first ring 52 and second ring 54. First ring 52 and second ring 54 are rotatably connected by first hinge 56 and second hinge 58 and may be fixedly connected by first hinge 56 and second hinge 58. First ring 52 has first sleeve 30 and second sleeve 62 fixedly engaged to first ring 52. First ring 52, first sleeve 30 and second sleeve 32 have a continuous opening running the length of first sleeve 30, second sleeve 32 and through first ring 52. First arm 10 of support element 20 passes through first sleeve 30 and second arm 12 passes through second sleeve 32 so that frame element 50 may rotate a full three hundred and sixty degrees around support element 20. Subject 26 is shown positioned upon stage 22 for photographing. Stage 22 is transparent so that subject 26 may be photographed from below stage 22. Subject 26 is representative of any object that may be placed on stage 22 and is meant to embody all variations of size and shape including shapes with interior surfaces. Alternatively, stage 22 may be constructed as a grid or screen to allow passage of a borescope for obtaining images of interior surfaces of subject 26.

Camera element 80 has mount 74, base 72 and rod 70. Base 72 is fixedly connected to rod 70. Mount 74 is adjustably affixed to base 72. Rod 70 passes through third sleeve 34 in second ring 54. Rod 70 is rotatably and slidingly engaged in third sleeve 34. Camera 90 is removably engaged to mount 74. The center of the lens of camera 90 is aligned with the center of subject 26. More specifically, the center of the lens of camera 90 is aligned to intersect an imaginary horizontal line running through the center of first sleeve 30, second sleeve 32 and an imaginary vertical line running through the center of stage 22. Camera 90 is meant to represent all formats of photography and videography including large, medium and miniature still cameras, digital still cameras, digital still and motion cameras, digital motion cameras, macro and micro photography analog and digital videography cameras, film motion picture cameras in all formats, cameras for sending images over the internet, cameras with borescopes, and cameras with zoom or fixed lenses. Because studio 100 and its alternative embodiments disclosed farther herein can be constructed of any size, any existing camera system can be adapted for mounting on mount 74.

First arm 10 is bent after passing through first sleeve 30 and may be bent again prior to connecting to ring 14. Second arm 12 is bent after passing through second arm 12 and may be bent again prior to connecting to ring 14. The depth of ring 14 below a centerline passing through first sleeve 30 and second sleeve 32 will determine the size or height of subjects to be photographed in studio 100. The center of mass of subject 26 when placed on stage 22 should be intersected by an imaginary line passing through first sleeve 30 and second sleeve 32 and an imaginary vertical line running through the center of stage 22. The center of mass of subject 26 should also be intersected by an imaginary line passing through the center of the lens of camera 90 and perpendicular to the lens. As used herein the term subject means the physical object whose image is to be captured. A subject may be inanimate or it may be a living person, animal ro organism.

In the preferred embodiment, a first arm and a second arm are used. However, stage 22 may be supported by only one arm. Frame 50 may rotate about the single arm.

Camera 90 can rotate three hundred and sixty degrees about subject 26 because frame 50 will rotate on first sleeve 30 and second sleeve 32. Subject 26 can rotate three hundred and sixty degrees about stage support 14 on stage 22 so that any view of subject 26 can be obtained including a bottom view.

Figure 2:
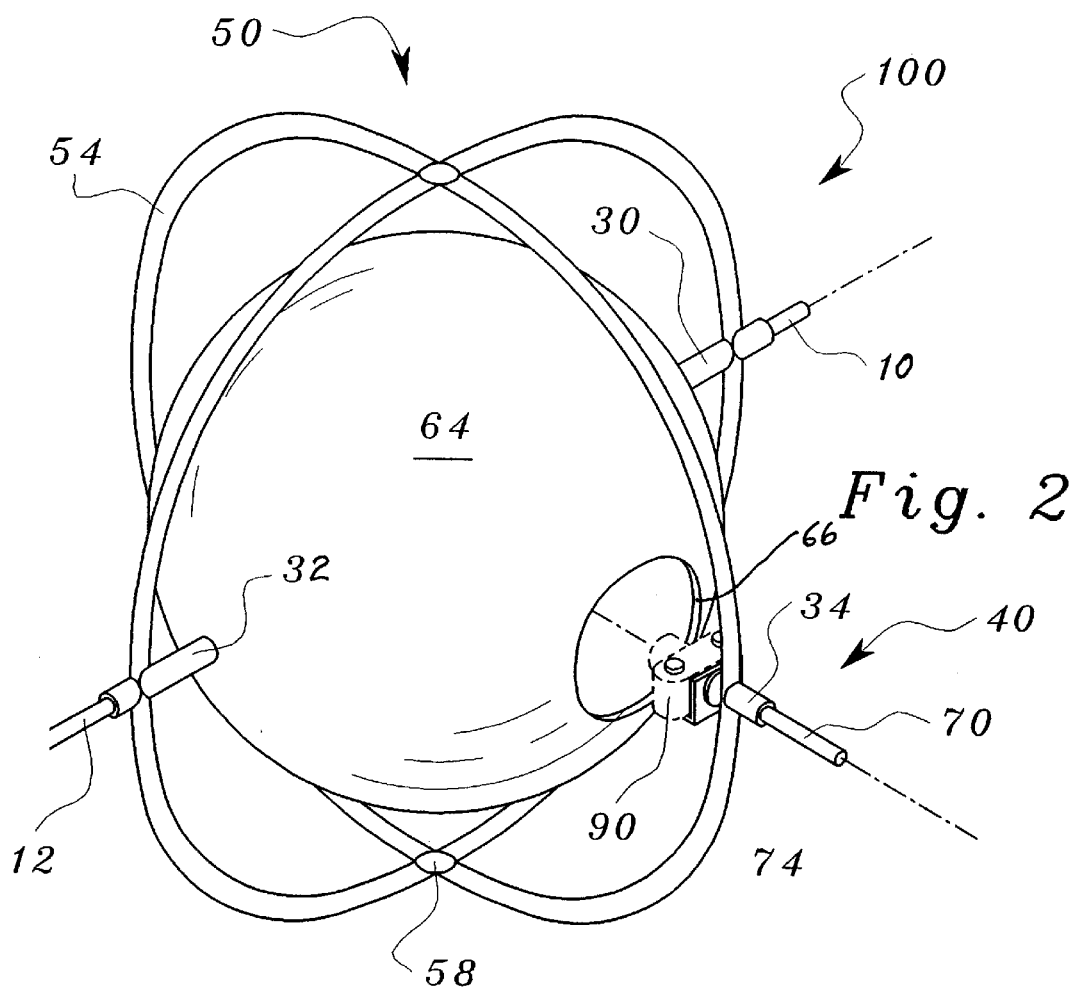
FIG. 2 depicts a left perspective view of the frame with spherical dome deployed.

FIG. 2 depicts sphere 64 mounted on first sleeve 30 and second sleeve 32. First sleeve 30 cannot be seen; however, first arm 10 can been seen beyond spherical cover 64. Second sleeve 32 can be seen with second arm 12 emerging from second sleeve 32. Sphere 64 may be made of any transparent or translucent material. As used herein, transparent means a material which admits the passage of light and may permit a clear view of objects beyond the material.

Transparent material may distort the environment beyond the material by acting as a filter due to coloring. Moreover, a transparent material may have a pattern in it which can affect the color, tone and density of the light passing through the material. As used herein, translucent means allowing the passage of light, but not permitting a clear view of any object. In the preferred embodiment the translucent material would be semi-transparent. Moreover, by translucent material is further meant a material of any color or surface texture including but not limited to shiny, smooth, textured or matte. Moreover, in creating enclosures, transparent and translucent material may be used together in layers, together in sectional combination or separately. Moreover, transparent and translucent materials may be used in combinations of shapes such as a sphere inside a cone in order to achieve varying degrees of translucency and lighting effects.

Figure 3:
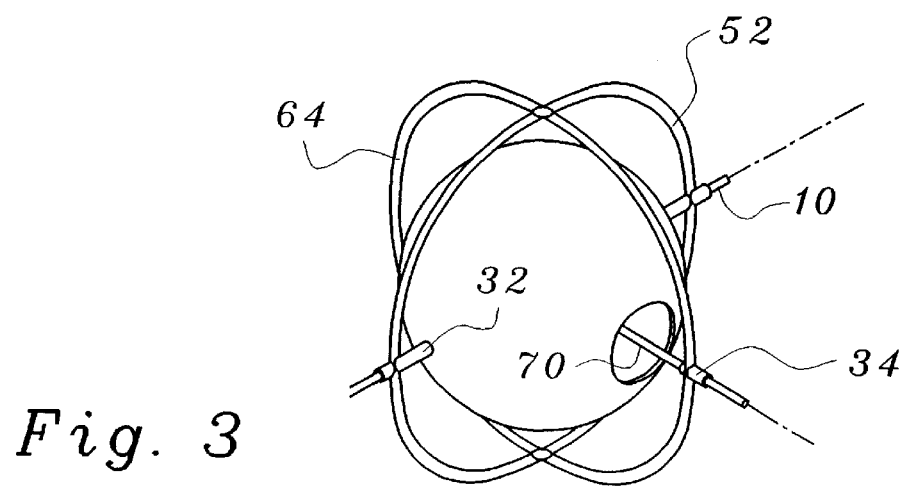
FIG. 3 depicts the frame with spherical dome and camera.

FIG. 3 depicts camera 90 deployed inside sphere 64 on rod 70. Rod 70 is slidingly and frictionally engaged in third sleeve 34.

FIG. 4 depicts a portion of support element 20 showing the rotation of stage 22 around stage support 14. Stage 22 can rotate clockwise or counterclockwise.

FIG. 5 depicts an enlarged view of second sleeve 32 which is fixedly engaged to first ring 52 so that second arm 12 passes through both sleeve 32 and second ring 52. Frame 50 and second ring 52 can rotate three hundred and sixty degrees about second arm 12.

FIG. 6 depicts an enlarged view of camera element 90 showing the rotation of mount 74 and base 72 around rod 70 in third sleeve 40. Rod 70 passes through third sleeve 40 and second ring 54 and is slidingly engaged in third sleeve 40 so that camera 90 may move forward and backward on rod 70.

Figure 7:
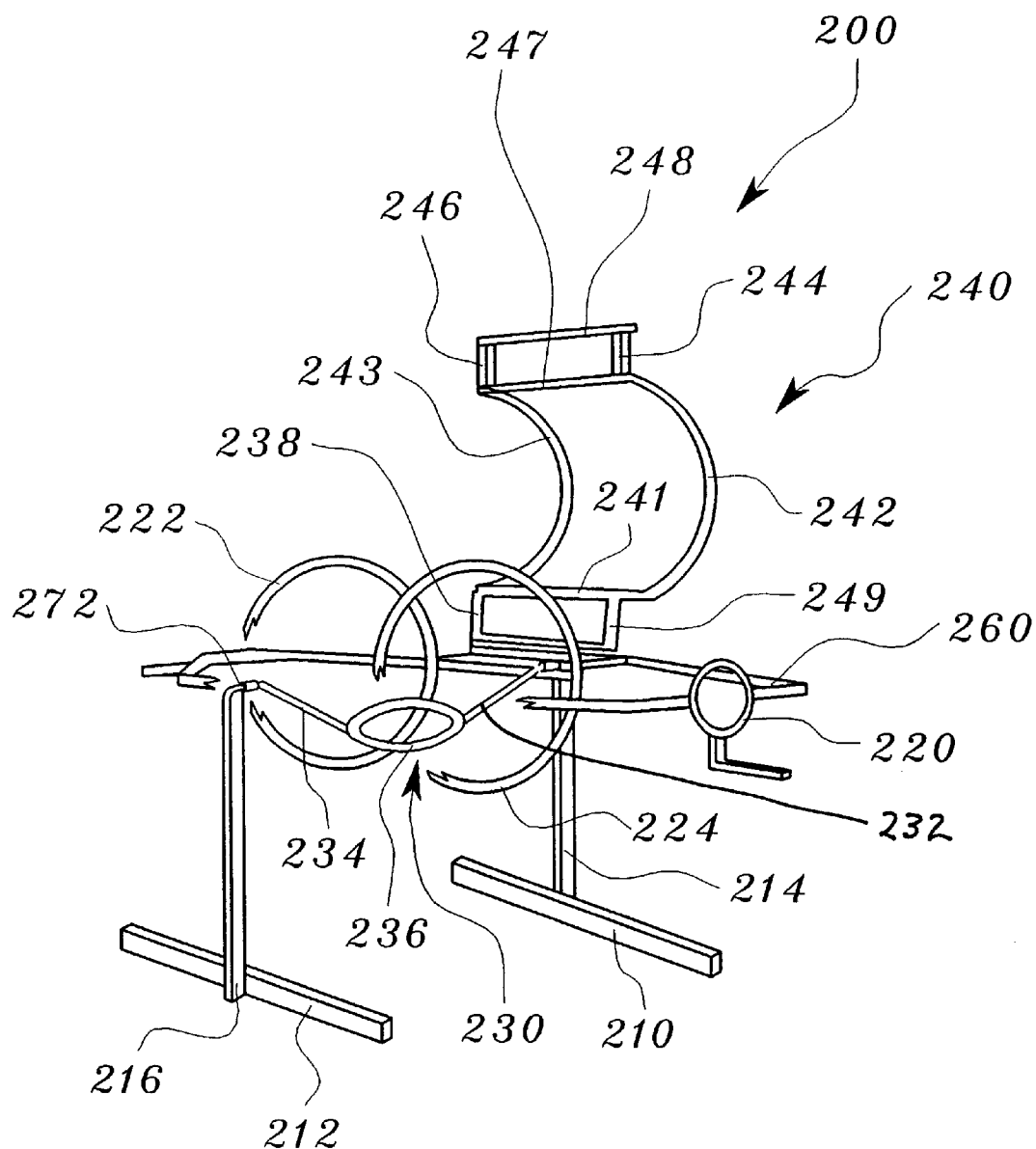
FIG. 7 depicts a right side perspective view of the stage and frame of an alternate embodiment.

FIG. 7 depicts an alternative embodiment of studio 100 shown in FIGS. 1 through 6. Second studio 200 has outer frame 260 supporting entry ring 220, cone ring 224 and hemisphere ring 256. Door element 240 allows access to second studio support element 230 having second studio first arm 232 fixedly connected to second studio stage support 236 and second studio second arm 234 fixedly connected to second studio stem support 236. Second studio stage support 236 functions in the same manner as stage support 14 in FIG. 1 of studio 100. Second studio stage support 236 will rotatably support stage 22 (not shown). Second studio door element 240 has second studio door outer frame 249 hingedly connected to second studio outer frame 260. Second studio door outer frame 249 has second studio door outer frame first connecting arm 249 fixedly engaged to second studio door inner frame 241 and second studio outer frame second connecting arm 238 fixedly connected to second studio door first inner frame 241. Second studio door first curved frame 242 is fixedly connected to second studio first inner frame 241 and second studio second inner frame 247. Second studio second curved frame 243 is fixedly connected to second studio first inner frame 241 and to second studio second inner frame 247. Second studio second outer frame 248 is fixedly connected to second studio second inner frame 247 by second studio second outer frame first connecting arm 244 and second studio second outer frame second connecting arm 246.

Figure 8:
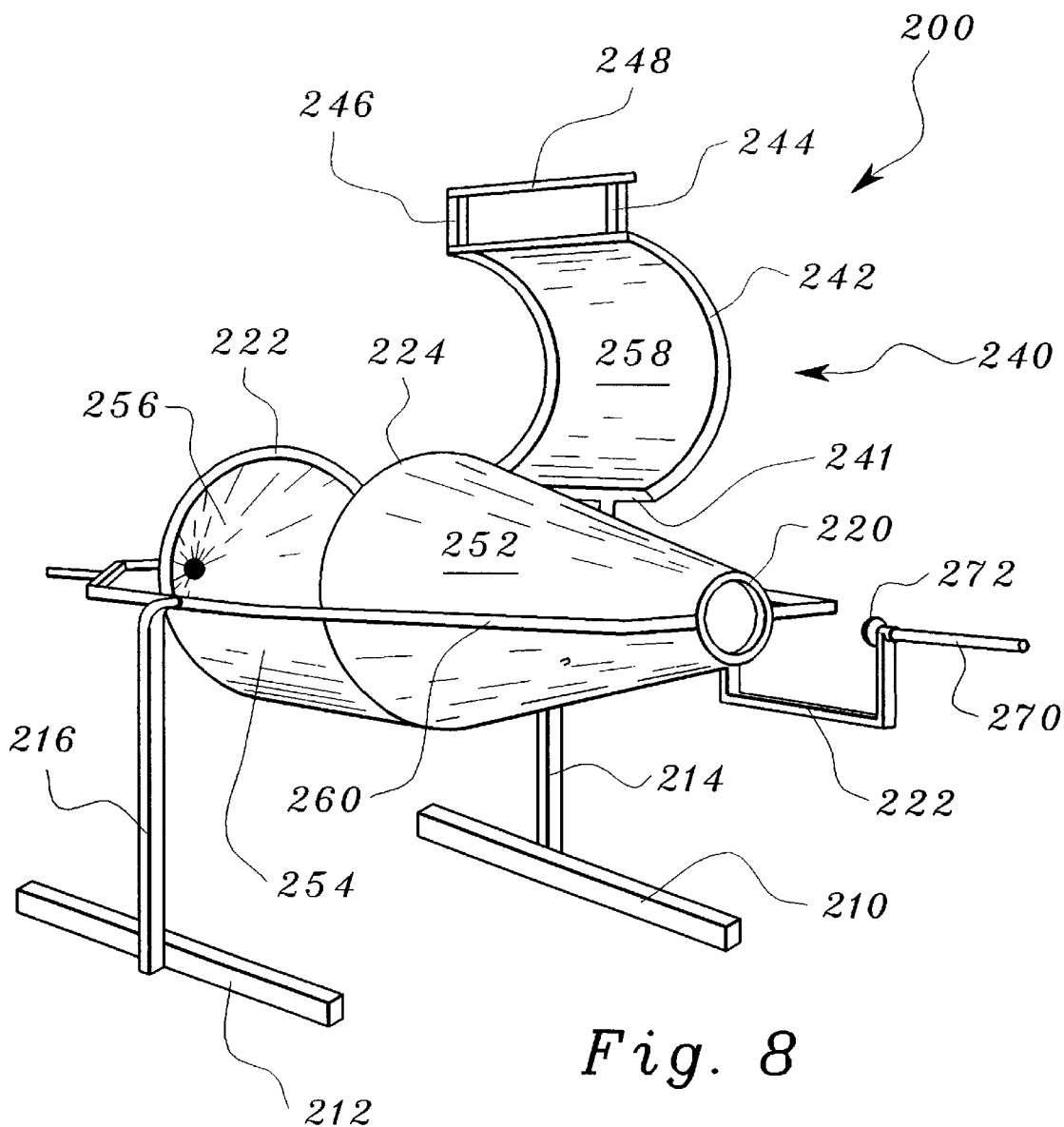
FIG. 8 depicts a view of a first alternate embodiment with cover.

FIG. 8 shows second studio 200 covered with three sections of translucent covering. Cone cover 252, cylinder cover 254, door cover 258 and hemisphere cover 256 provide translucent covering for second studio 200. The translucent covering may be solid material such as plastic or polyurethane or it may be cloth or other material that can be slit to introduce lights inside the area enclosed by the material. A camera such as camera 90 (See FIG. 1) may be mounted on second studio camera arm 222. Second studio rod 270 is slidingly engaged in second studio camera arm 222. Second studio door element 240 has second studio door outer frame 249 (see FIG. 6) hingedly connected to second studio outer frame 260. Second studio door element 240 allows access to the interior of second studio 200 so that subjects to be photographed may be placed on stage 22 rotatably mounted on second studio stage support 236 (not shown). Second studio outer frame 260 rotates about second studio second arm 216 and second studio first arm 214. Second studio second arm 216 passes through second studio outer frame socket 217 and continues to meet stage support 14 (not shown in FIG. 8) in the same way as second arm 12 meets stage support 14 in FIG. 1.

Figure 9:
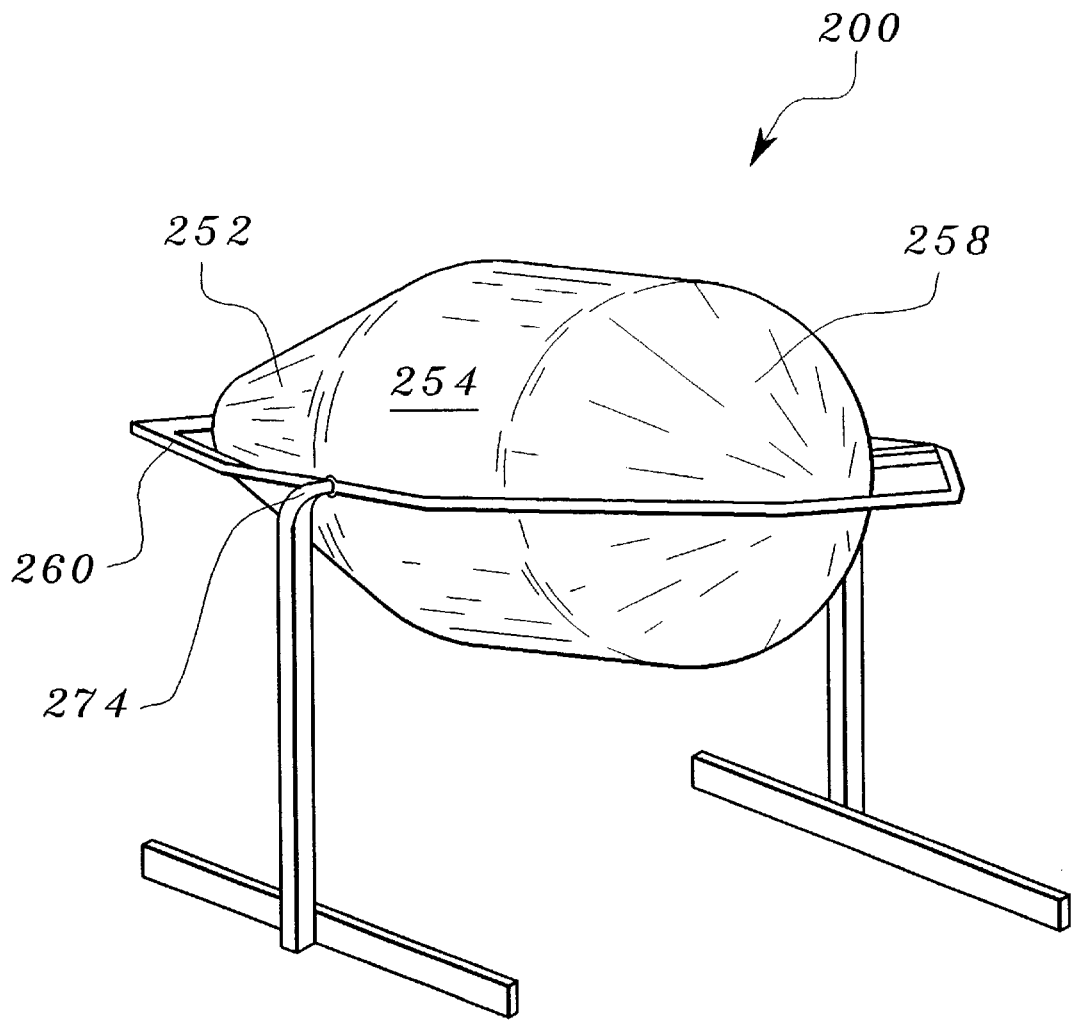
FIG. 9 depicts a rear view of the first alternate embodiment.

FIG. 9 shows second studio 200 from a rear view. The rounded aspect of hemisphere cover 256 can be seen in the rear view.

Figure 10:
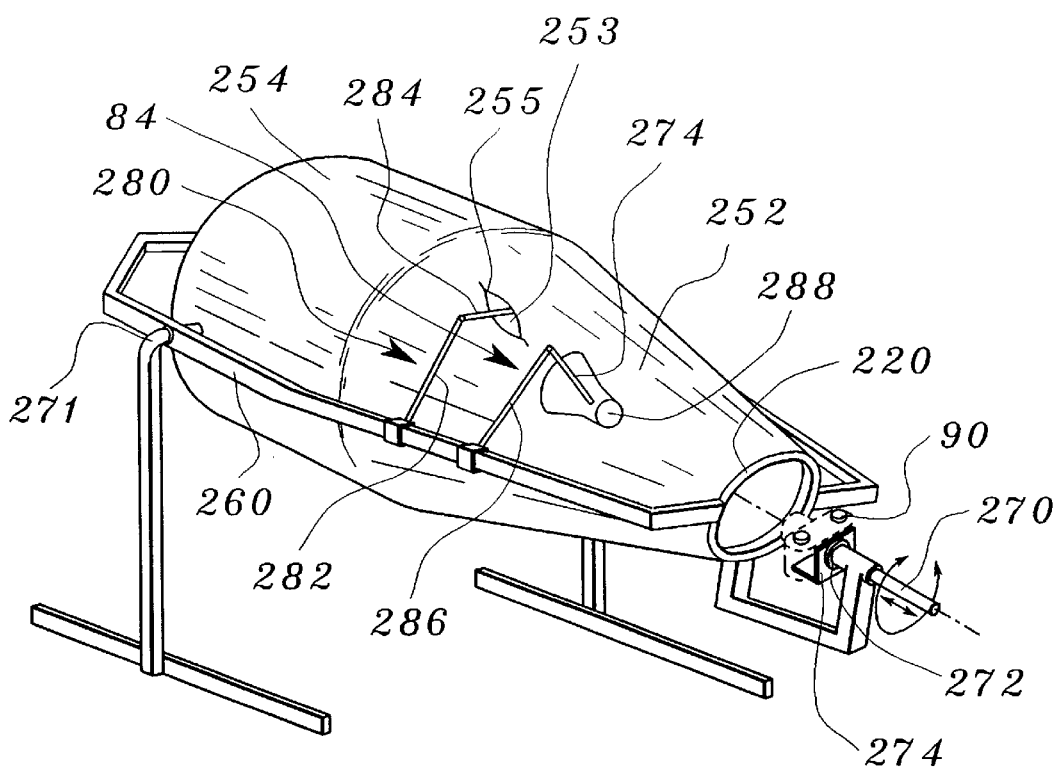
FIG. 10 depicts a view of the first alternate embodiment with lighting affixed to the frame.

FIG. 10 shows second studio 200 with first light 270 and second light 280 adjustably affixed in to second studio frame 260. First light 270 has first light first arm 272, first light second arm 274, first light bracket 276 and first light hood 278. In the preferred embodiment first light 270 is mounted outside of second studio cone covering 252. Any number of first light 270's may be affixed to second studio frame 260. Second light 280 has second light first arm 282, second light second arm 284, second light bracket 286 and second light hood (not shown) which is inside second studio cone covering 254 in light aperture 253 created by slit 255. Any number of second light 280's may be affixed to second studio frame 260. In the preferred embodiment first light 280 is mounted so that second light hood is inside studio cone covering 252.

Figure 11:
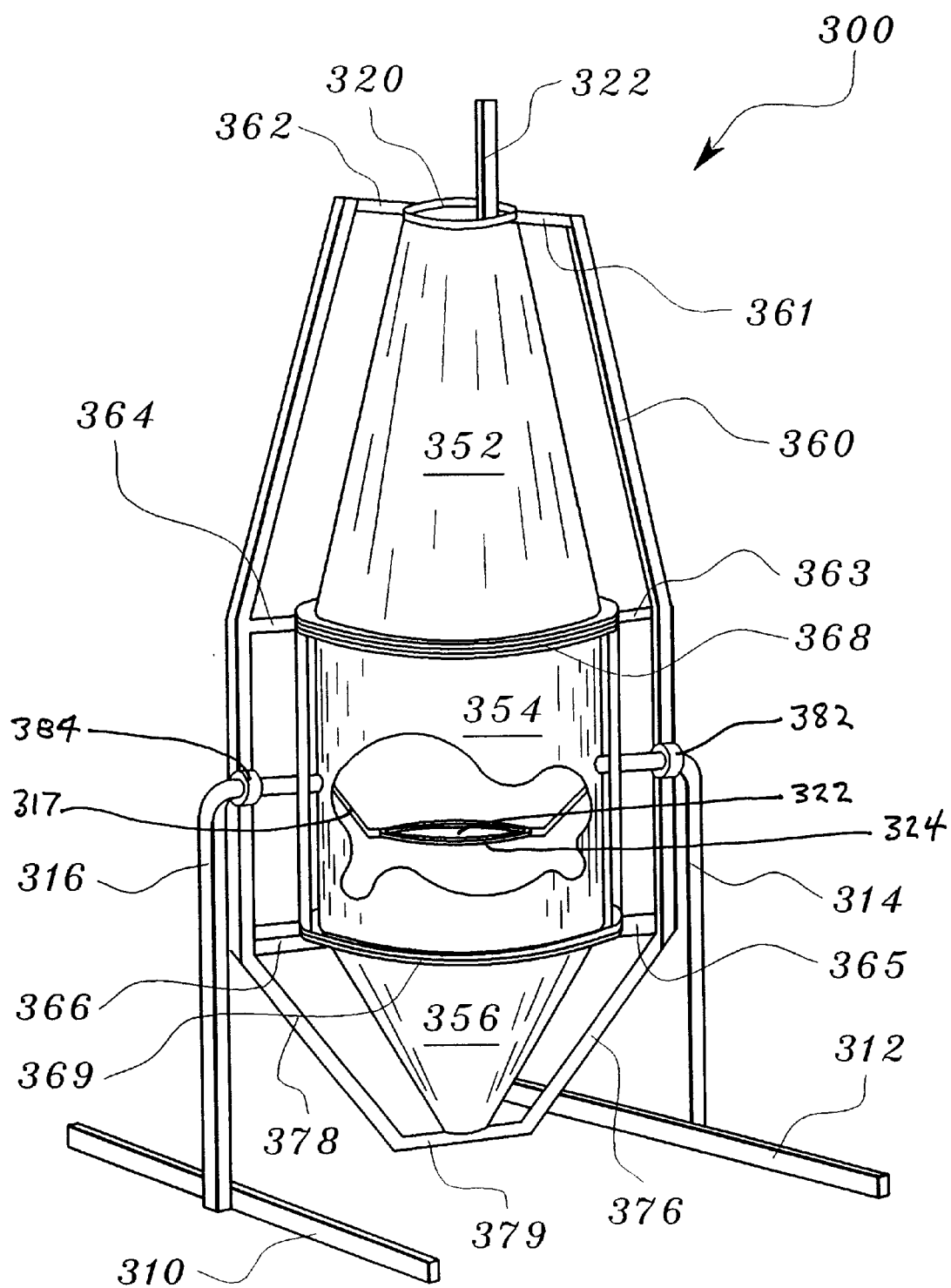
FIG. 11 depicts a view of a second alternate embodiment with the frame rotated to the vertical.

FIG. 11 depicts studio 300 which is another embodiment of studio 200. Studio 300 operates on the same principle as studio 100 and studio 200 to create an infinite variety of manageable, repeatable and seamless fighting options by allowing rotation about a subject while maintaining the same background and lighting effects.

Figure 12:
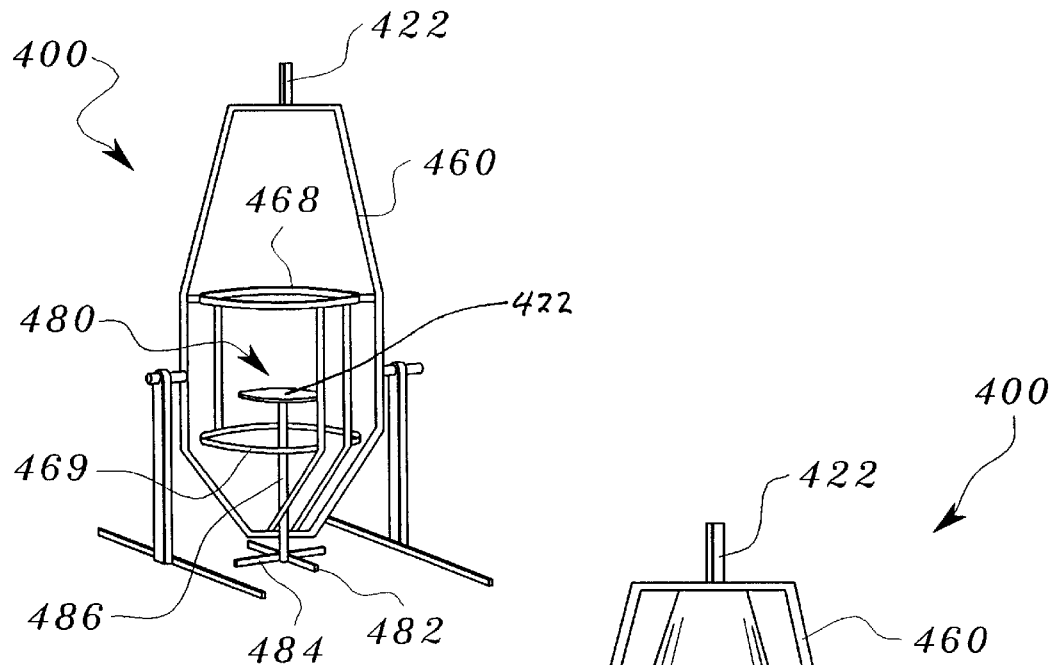
FIG. 12 depicts a third alternate embodiment of the studio.

FIG. 12 depicts third studio 400 which is another embodiment of studio 100 and second studio 200 which employs pedestal 480 having a pedestal stage 422, a stage 482, first leg 484 and second leg 486.

Figure 13:
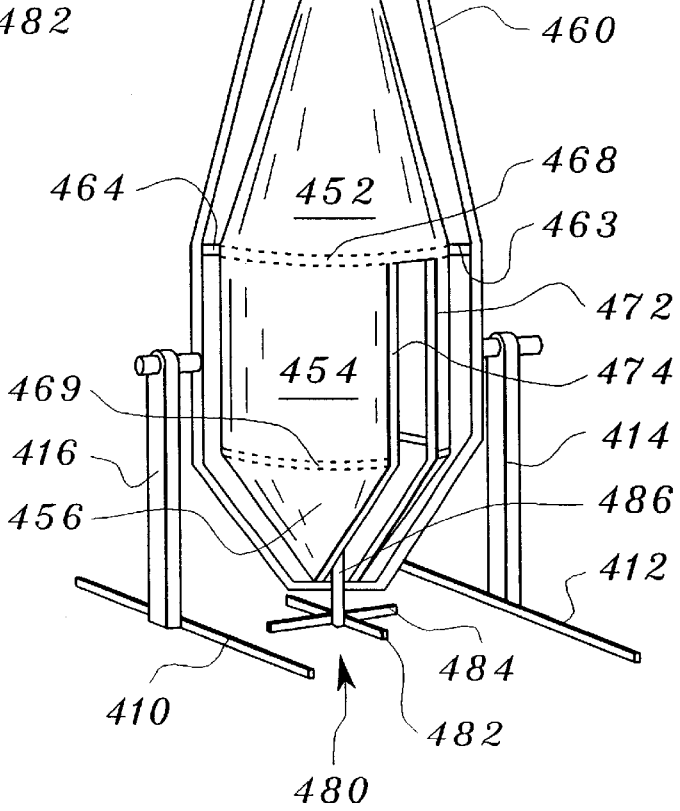
FIG. 13 depicts the third alternate embodiment with cover.

FIG. 13 depicts studio 400 covered and rotated to a vertical position. FIG. 12 shows that pedestal 480 remains stationary when studio 400 rotates.

Figure 14:
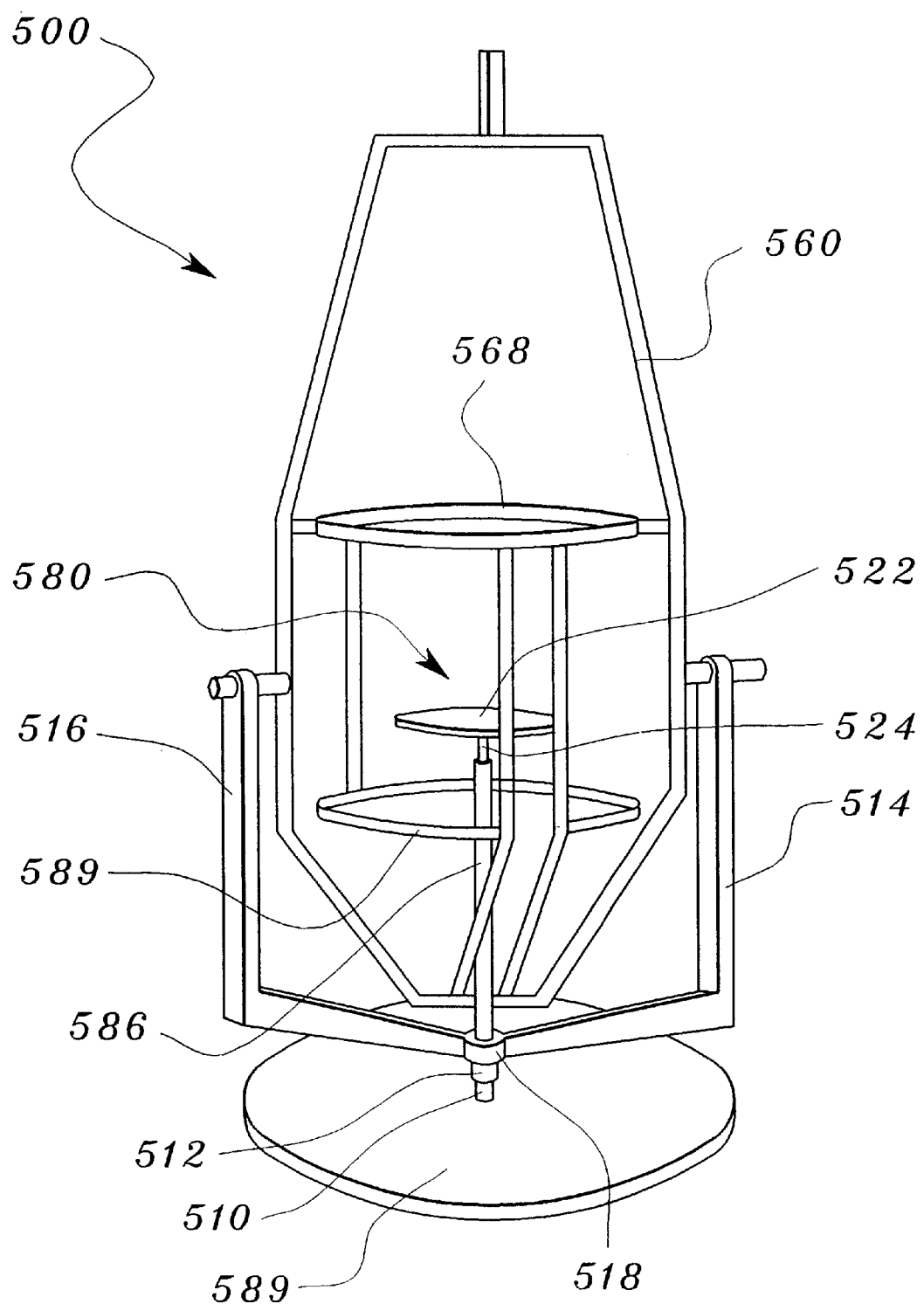
FIG. 14 depicts a fourth alternate embodiment.

FIG. 14 depicts fifth studio 500. Fifth studio frame 560 rotates about fifth studio stage 522 in both the horizontal and vertical axis by means of collar 518 rotatable affixed to pedestal stage support 586 and fixedly engaged to fifth studio first arm 514 and fifth studio second arm 516. Fifth studio stage 522 rotates in the horizontal axis on pedestal stage support 586. Additionally, fifth studio stage 522 can be raised or lowered by raising or lowering pedestal stage support 586. Stop 512 can be tightened to anchor collar 518 in position.

Figure 15:
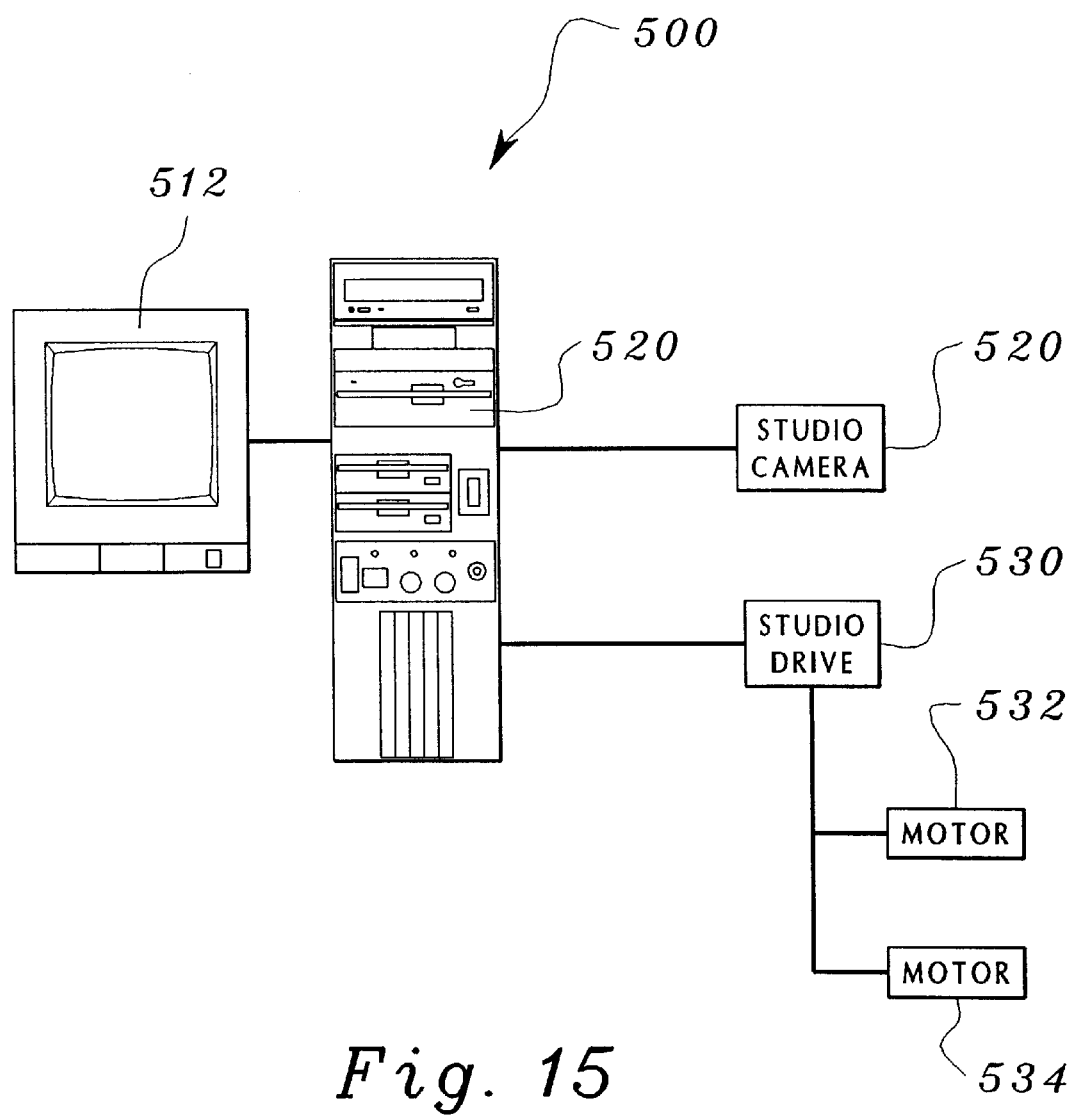
FIG. 15 depicts diagram of a computer controlled drive system for the studio.

FIG. 15 depicts computer 512 linked to camera 90 and to a drive for either studio 100, second studio 200, third studio 300, fourth studio 400 or fifth studio 500. As used herein, the term computer means a functional unit that can perform substantial computations, including numerous arithmetic operations and logic operations without human intervention during a run. In information processing, the term computer usually describes a digital computer. A computer may consist of a stand alone unit or may consist of several interconnected units. As used herein a personal computer (PC) means a microcomputer primarily intended for stand-alone use by an individual. As used herein, the term computer is mean to encompass desktop computers, laptop computers, mainframe computers, microcomputers, minicomputers, portable computers and super mini computers. Computer 512 can be a single computer or may be linked to a Local Area Network (LAN) or to a Wide Area Network (WAN). Computer 512 may be linked to the Internet thereby linking camera 90 and drive drives to the Internet for remote control of the camera and drives. As used herein, Internet means the worldwide collection of networks and gateways that use the TCP/IP suite of protocols to communicate with one another. At the heart of the internet is a backbone of high-speed data communication lines between major nodes or host computers, consisting of thousands of commercial, government, educational, and other computer systems, that route data and messages. All of the embodiments of the invention can be driveized and driven by a computer. Two types of drive systems are known in the art. First, the system may be driven by a direct current (DC) servo drive. In order to use a DC servo drive with any of the above described studio embodiments the exact position of the drive must be known. Therefore, an encoder must be used if a DC servo drive is employed. The second type of system is a step drive system. As used herein a step drive system means an electric drive whose shaft moves in individual steps of approximately 9 degrees each. The drive shaft has permanent magnets attached to it and each step is controlled by energizing one or more of the coils inside the drive which then interacts with the permanent magnets attached to the shaft. Turning these coils on and off in sequence causes the drive to rotate in either the forward or reverse direction. The time delay between each step determines the drive's speed. Step drive systems can be used to move a device driven by the step drive drive to any desired position by sending the step drive drive the number of step pulses corresponding to the desired position. Step drive systems therefore, do not need encoders. A further advantage of step drive systems is the ability to remain at one position rigidly. A computer connected to the step drive system will know the position of the drive at all times since the number of steps can be stored. In order to ensure the accuracy of the position an optical encoder could be attached to the drive. Most step control systems have a home switch associated with each drive that will allow the software to determine the starting or reference "home" position.

One available control system comprises a MD-2 Dual Stepper Drive Control System manufactured by Arrick Robotics, P.O. Box 1574, Hurst, Tex. 76053. The Arrick Robotics system connects to the parallel port of an IBM style personal computer by connecting a control device to the parallel port on the computer. Up to six drives (3 MD-2 systems) can be connected to one computer. Programming can be accomplished with Arrick motion control programs and DOS command-line interpreter. Custom programs can be written using Arrick subroutine libraries. The MD-2 system can be operated from an AC outlet or from a battery.

Likewise, the lights may be controlled by the computer. For example, X10 (USA) Inc., 91 Ruchmas Rd., Closter, N.J. 07674 provides a wireless computer interface for controlling up to 256 lights and appliances by remote control from a PC. The X10 system includes TM751 transceivers and LM465 lamp modules.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed:

1. A method of photographing a subject comprising the steps of:

placing the subject on a support element within an enclosure rotatably attached to the support element and capable of rotating about the subject in a horizontal axis and a vertical axis;

adjusting a camera on a camera platform rotatably attached to the enclosure so that an imaginary line through the center of a lens of the camera will intersect an imaginary line through the point of rotation of the enclosure about the subject;

rotating the enclosure to a desired angle; and photographing the subject and a background.

2. The method of claim 1 further comprising the step of:

repeating the rotating steps and photographing steps of claim 1.

3. The method of claim 1 further comprising the steps of:

connecting the enclosure to a first drive;

connecting the support element to a second drive;

connecting the camera to a computer;

connecting the first drive and the second drive to the computer;

moving the enclosure in response to commands to said computer;

recording images of the subject in the memory of the computer in response to commands to the computer.

4. The method of claim 1 further comprising rotating the enclosure about the support element so that an imaginary line drawn through the center of a lens of the camera mounted on the camera platform will intersect the background at the same point throughout the rotation.

5. The method of claim 1 further comprising adjusting a plurality of lights movably engaged to the enclosure.

6. A method of capturing a photographic image of a subject where the camera is attached to an enclosure having a background and the subject is positioned on a support element, the enclosure and the support element further connected to an enclosure drive and a support element drive controlled by a computer comprising the steps of:

responsive to a first set of instructions from the computer positioning the subject on the support element within the enclosure rotatably attached to the support element and capable of rotating about the target subject in the horizontal and vertical axis;

responsive to a second set of instructions from said computer rotating the enclosure about the support element so that an imaginary line drawn through the center of a lens of the camera mounted on the camera platform will intersect the background at the same point throughout the rotation;

responsive to a third set of instructions from the computer capturing an image of the subject.

7. A programmable apparatus for capturing the image of a subject comprising:

programable hardware comprising;

at least one computer;

at least one drive;

a program installed on said computer;

a support element;

a stage rotatably affixed to the support;

an enclosure rotatably attached to said support element and capable of rotating about the subject in a horizontal axis and a vertical axis;

a camera platform rotatably attached to said frame;

a camera attached to said camera platform;

a subject positioned on said stage; wherein responsive to instructions from said computer, said camera platform rotates around said target subject.

8. The programable apparatus of claim 7 wherein, responsive to instructions from said computer, said stage rotates.

9. The programmable apparatus of claim 7 wherein, responsive to said computer said camera captures images of said subject.

10. The programmable apparatus of claim 7 further comprising a plurality of lights wherein said lights may be controlled manually or by a said computer.

11. The programable apparatus of claim 7 further comprising a connection to the Internet.

12. The programmable apparatus of claim 7 further comprising a background attached to the enclosure so that when the enclosure rotates about the support element, an imaginary line drawn through the center of a lens of the camera mounted on the camera platform will intersect the background at the same point throughout the rotation.

* * * * *